US009858407B2

(12) United States Patent
Caron et al.

(10) Patent No.: US 9,858,407 B2
(45) Date of Patent: Jan. 2, 2018

(54) SECURE AUTOMATIC AUTHORIZED ACCESS TO ANY APPLICATION THROUGH A THIRD PARTY

(71) Applicant: McAfee, Inc., Santa Clara, CA (US)

(72) Inventors: Etienne Caron, Montreal (CA); Kwaku Zigah, Montreal (CA); Mathieu René, Montreal (CA); Richard Bruno, St Albans, VT (US)

(73) Assignee: McAfee, LLC, Santa Clara, CA (US)

( * ) Notice: Subject to any disclaimer, the term of this patent is extended or adjusted under 35 U.S.C. 154(b) by 99 days.

(21) Appl. No.: 14/893,885

(22) PCT Filed: Apr. 4, 2014

(86) PCT No.: PCT/CA2014/050343
§ 371 (c)(1),
(2) Date: Nov. 24, 2015

(87) PCT Pub. No.: WO2014/186882
PCT Pub. Date: Nov. 27, 2014

(65) Prior Publication Data
US 2016/0103988 A1  Apr. 14, 2016

Related U.S. Application Data

(60) Provisional application No. 61/827,331, filed on May 24, 2013.

(51) Int. Cl.
G06F 21/41 (2013.01)
H04L 29/06 (2006.01)
G06F 21/31 (2013.01)

(52) U.S. Cl.
CPC .......... G06F 21/41 (2013.01); H04L 63/0815 (2013.01); G06F 21/316 (2013.01)

(58) Field of Classification Search
CPC ... G06F 21/41; G06F 21/6218; H04L 63/0815
See application file for complete search history.

(56) References Cited

U.S. PATENT DOCUMENTS 7,150,038 B1  12/2006  Samar
7,660,880 B2  2/2010  Ting et al.
(Continued)

OTHER PUBLICATIONS

Belenko et al., "'Secure Password Managers' and 'Military-Grade Encryption' on Smartphones: Oh, Really?", Blackhat Europe, Retrieved From https://pt.elcomsoft.com/WP/BH-EU-2012-WP.pdf, Published 2012.*

(Continued)

Primary Examiner — Chau Le
(74) Attorney, Agent, or Firm — Blank Rome, LLP

(57) ABSTRACT

A method and process for users to have secure access to multiple mobile, embedded or web based applications, is provided whereby each requires different authentication, and access to such applications is automated through the use of a single authenticating and authorizing software; the software thereby securely managing the individual authorizations and, in so doing, the authentication required by any individual application independent of the device used. To protect against any intrusion and manipulation while assuring that only legitimate user(s) that are properly authenticated have access to their applications the method secures the secret information required to access these applications and minimizes exposure to any sensitive information. Moreover, any secrets that protect information are themselves secured and made strong and the means of access is simplified and automated as much as possible while safeguarding security and confidentiality.

15 Claims, 5 Drawing Sheets

(56) References Cited

U.S. PATENT DOCUMENTS

| | | | |
|---|---|---|---|
| 7,818,582 B2 | 10/2010 | Marion et al. | |
| 8,024,781 B2* | 9/2011 | Saunders | G06F 21/10 726/5 |
| 8,327,427 B2 | 12/2012 | Soukup et al. | |
| 8,353,016 B1* | 1/2013 | Pravetz | G06F 21/36 715/749 |
| 8,663,004 B1* | 3/2014 | Xu | A63F 13/12 463/20 |
| 8,818,888 B1* | 8/2014 | Kapczynski | G06Q 40/02 705/35 |
| 2003/0103066 A1* | 6/2003 | Sigl | G06F 1/1626 715/700 |
| 2003/0182551 A1* | 9/2003 | Frantz | G06F 21/41 713/170 |
| 2004/0158746 A1 | 8/2004 | Hu et al. | |
| 2004/0205176 A1* | 10/2004 | Ting | H04L 67/306 709/223 |
| 2006/0075224 A1 | 4/2006 | Tao | |
| 2008/0059804 A1 | 3/2008 | Shah et al. | |
| 2009/0007256 A1* | 1/2009 | Raymond | G06F 21/33 726/19 |
| 2009/0172795 A1* | 7/2009 | Ritari | H04L 63/0815 726/7 |
| 2009/0222899 A1* | 9/2009 | Walters | G06F 21/41 726/8 |
| 2011/0055593 A1* | 3/2011 | Lurey | G06F 21/31 713/193 |
| 2011/0162066 A1* | 6/2011 | Kim | G06F 3/017 726/18 |
| 2012/0159612 A1* | 6/2012 | Reisgies | G06F 21/41 726/18 |
| 2012/0246079 A1* | 9/2012 | Wilson | H04L 63/0807 705/67 |
| 2012/0266220 A1* | 10/2012 | Brudnicki | G06F 21/629 726/6 |
| 2013/0067451 A1* | 3/2013 | Hussain | G06F 8/61 717/172 |
| 2013/0086669 A1 | 4/2013 | Sondhi et al. | |
| 2013/0125226 A1* | 5/2013 | Shah | H04L 63/0815 726/7 |
| 2013/0166918 A1* | 6/2013 | Shahbazi | H04L 9/0863 713/183 |
| 2014/0282851 A1* | 9/2014 | Miller | G06F 21/62 726/1 |
| 2016/0087947 A1* | 3/2016 | Wong | H04L 63/107 713/171 |

OTHER PUBLICATIONS

European Search Report received in corresponding European patent application No. 14801389.9-3005210, dated Dec. 13, 2016.

Fahl, S., et al., (2013), "Hey, You, Get Off of My Clipboard", Network and Parallel Computing; [Lecture Notes in Computer Science; Lect. Notes Computer], Springer International Publishing, Cham, pp. 144-161, XP047037684.

Anonymous: "Signons2.txt—MozillaZine Knowledge Base", Feb. 11, 2013, XP055325908, URL: https://web.archive.org/web/20130211101620/http://kb.mozillazine.org/Signons2.tx, p. 1.

* cited by examiner

Figure 1: The process by which Input Method is installed onto the Device and configured.
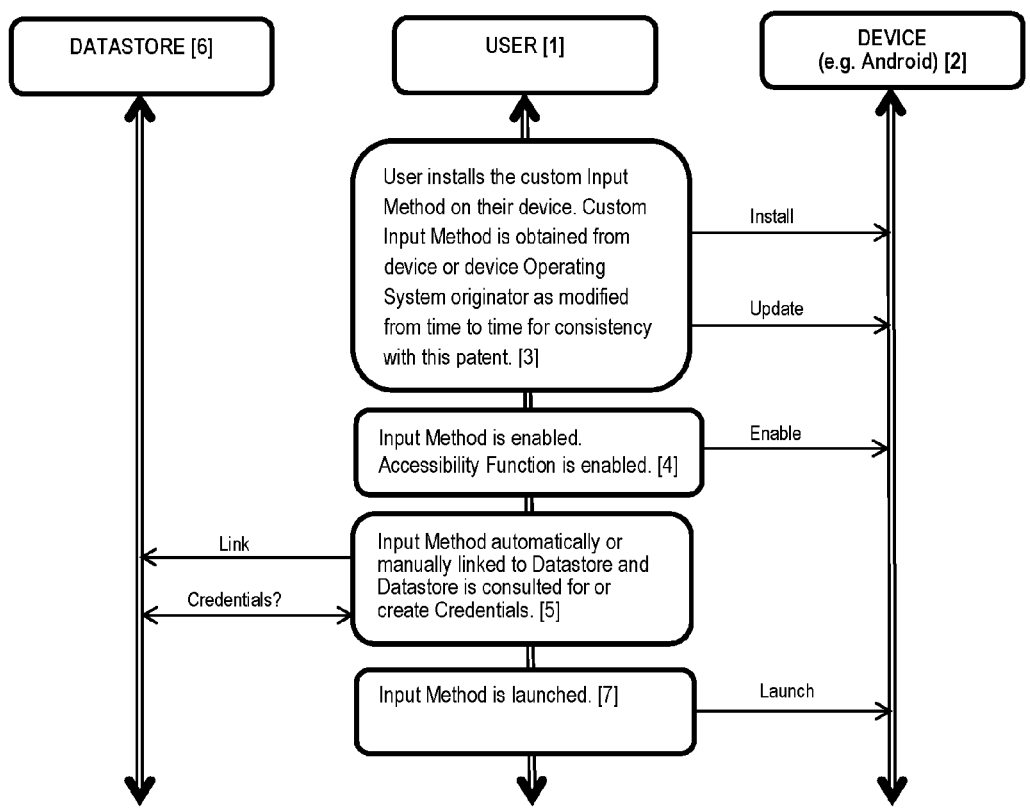

Figure 2: The process by which information is gathered from the Third Party Application and inform subsequent processes.
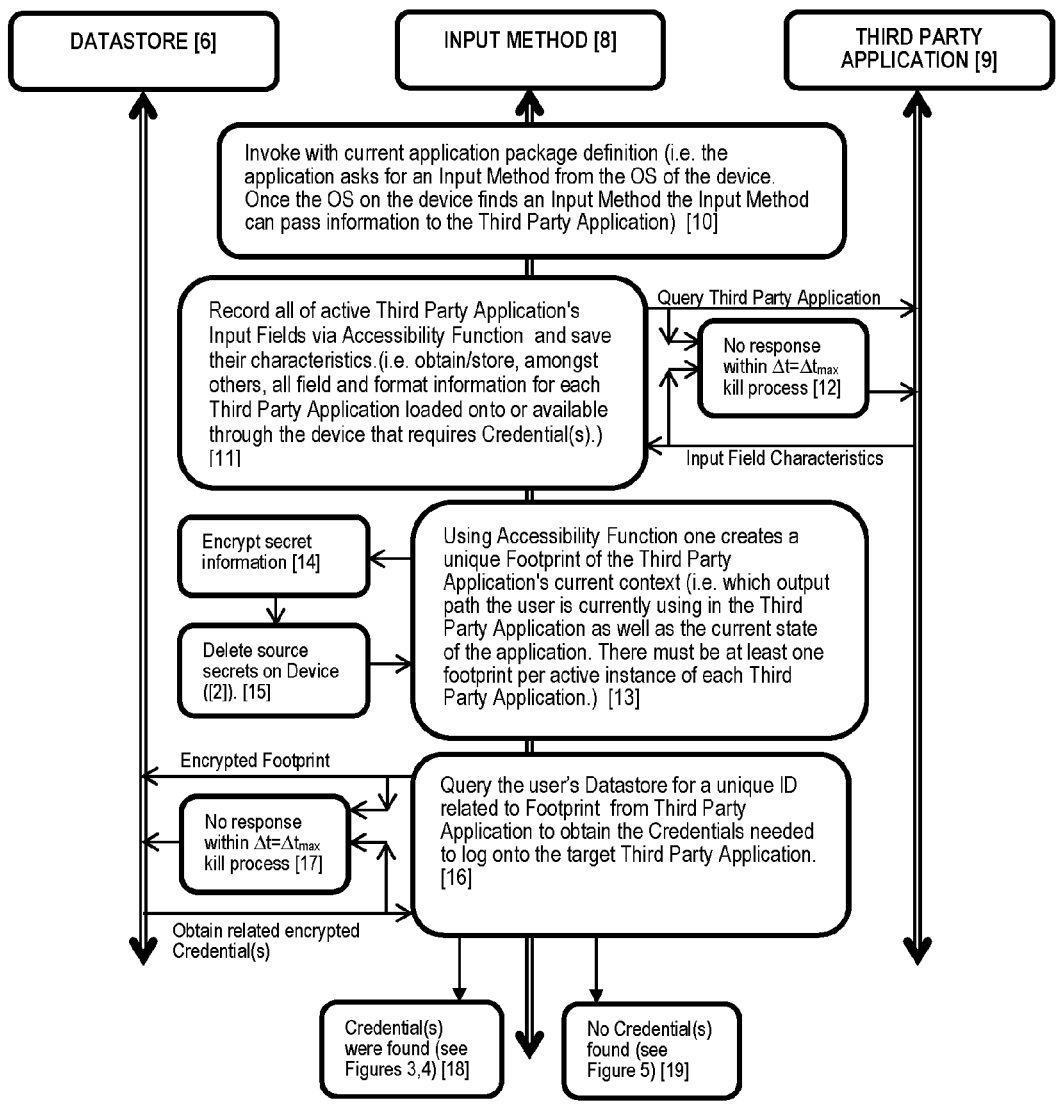

Figure 3: The process by which users are automatically logged onto a Third Party Application when the necessary and sufficient information is available for input.
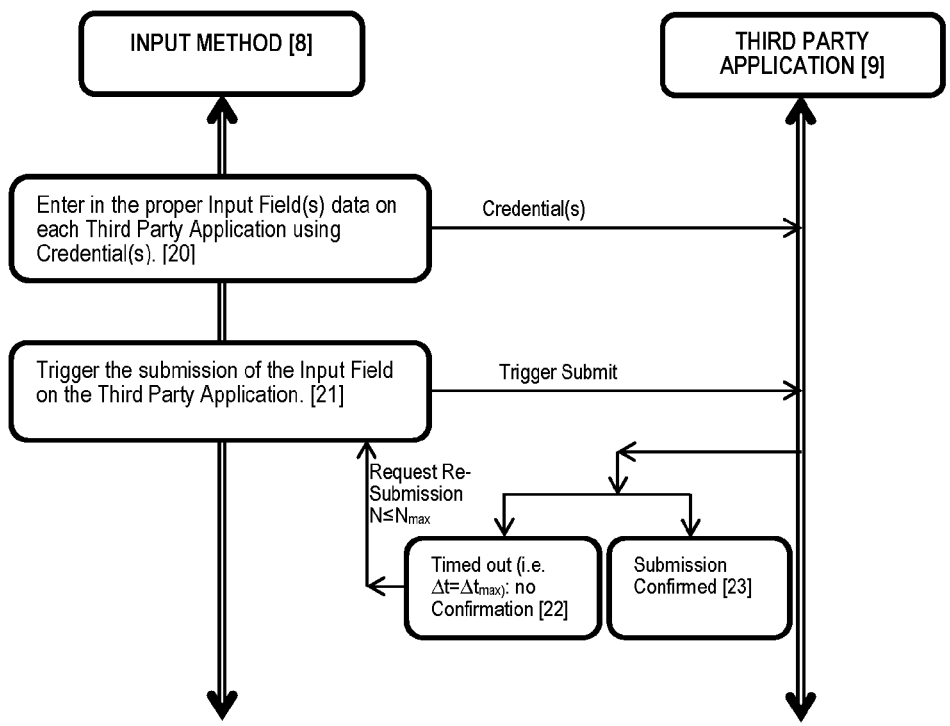

Figure 4: The process by which the user is prompted to choose between multiple accounts when more than one account may be used to log onto the Third Party Application.
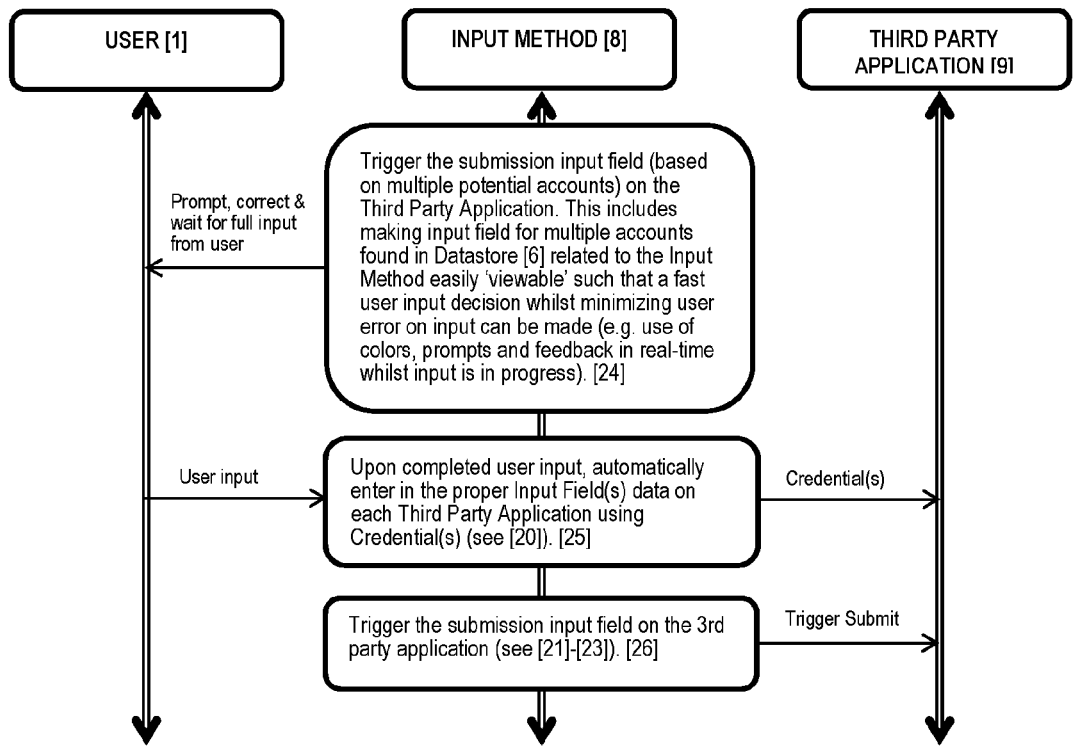

Figure 5: The process by which necessary information is obtained for future use of the Input Method when insufficient information is available to log users onto the Third Party Application.
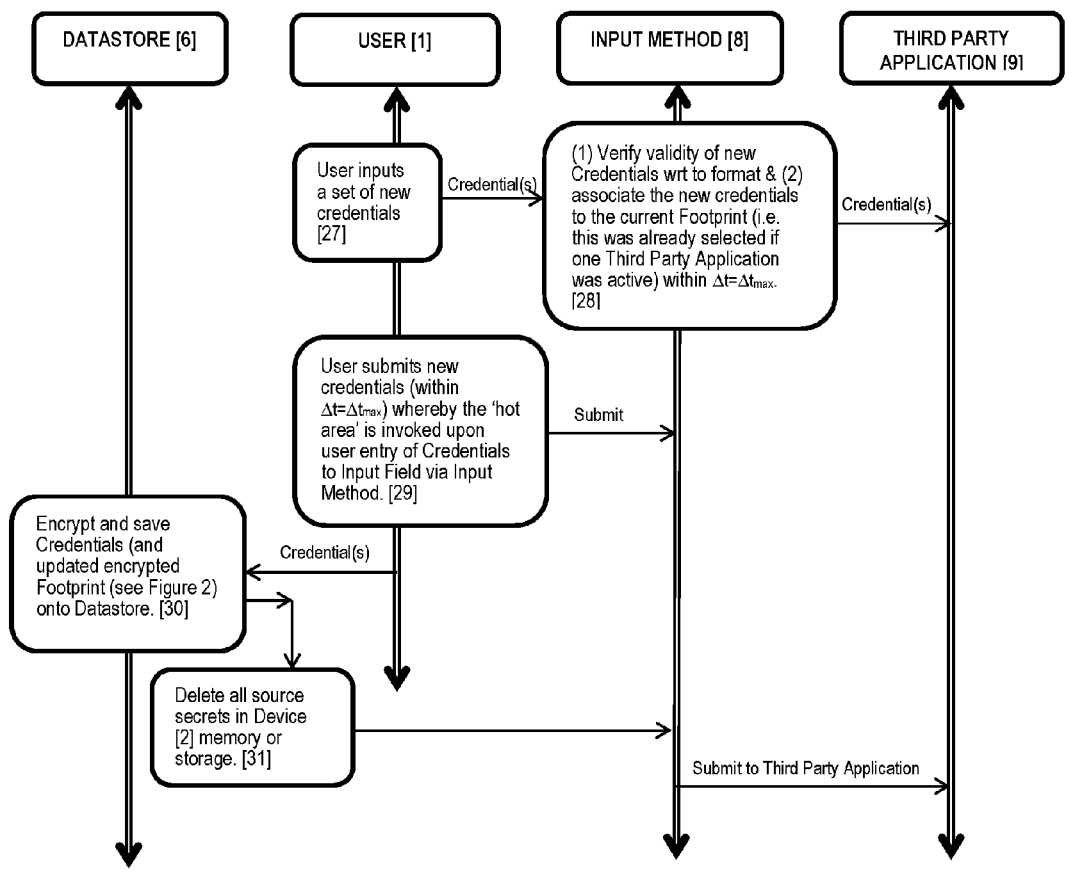

SECURE AUTOMATIC AUTHORIZED ACCESS TO ANY APPLICATION THROUGH A THIRD PARTY

FIELD

The present invention generally relates to the use of systems and the methods and processes for securely accessing mobile, embedded or web based applications as well as securely communicating data related thereto. More particularly, it relates to a method and process for users to have secure access to multiple mobile, embedded or web based applications, each requiring different authentication, whereby such access is automated through the use of a single authenticating and authorizing software. This authenticating and authorizing software securely manages any individual authorization and, in so doing, the authentication required by and for any application.

BACKGROUND

Many mobile, embedded or cloud based applications require, at the least, a user name password to be accessed on one or more devices. Users may have more than one account per application. For a legitimate user to access such applications he or she, by way of example, typically either adopts the same user name and password for all applications and accounts or stores the various user names and associated passwords chosen for each case on a list. More often than not, for simplicity of entering this information, most legitimate users do not choose either strong user names or, more importantly, strong passwords or other identifying information. Both of these approaches are prone to illegitimate parties, who are not authorized, to access sites and information as well as potentially manipulating data belonging to legitimate users.

To protect against such intrusion and manipulation whilst assuring that only legitimate user(s) that are properly authenticated have access their applications requires securing any secret information required to access these applications as well as minimizing exposure to any exposed sensitive information. Moreover, any secrets that protect information must themselves be strong and access needs to be as simple and automated as possible in the course of safeguarding and assuring confidentiality.

US 20130145447 A1 entitled "Cloud-based data backup and sync with secure local storage of access keys" discloses methods and systems provided for secure online data access. In one embodiment, three levels of security are provided where user master passwords are not required at a server. A user device may register with a storage service and receive a user device key that is stored on the device and at the service. The user device key may be used to authenticate the user device with the storage service. As data in the storage service is encrypted with a master password, the data may be protected from disclosure. As a user master key or derivative thereof is not used in authentication, the data may be protected from a disclosure or breach of the authentication credentials. Encryption and decryption may thus be performed on the user device with a user master key that may not be disclosed externally from the user device.

US 20120253985 A1 entitled "Method and system for extraction and accumulation of shopping data" discloses a method for shopping cart validation automation, comprising analyzing a webpage to determine if it contains a shopping cart structure and if the user has expressed desire to initiate a checkout procedure, extracting shopping cart and other price elements from pages of a checkout tunnel, accumulating such information for the shopping transaction, validating the shopping transaction using the accumulated information, and allowing the user to confirm or cancel the transaction upon validation. Alternatively, the method may message the use that the transaction is not reconcilable where the shopping cart could not be validated. Also, the system can advantageously build a history database storing transactional details, including screen shots of pages of the checkout tunnel.

US 20120116921 A1 entitled "Method and computer system for purchase on the web" discloses a method for online purchase automation, comprising identifying when the user has selected to navigate to or receive a web page related to a purchasing action, identifying when content of the web page is received; analyzing the web page concurrent with the purchase action, without requiring detailed structural information about the web page in advance, and determining whether the web page is related to a purchasing action, by parsing the web page or related data elements. If the web page is related to a purchasing action, the next steps are determining the user interface elements of the web page or related data elements, retrieving site-independent customer data for the purchase based on the analyzing of the user interface elements, simulating user input using the site-independent customer data to populate at least portions of the web page, and displaying to the user the populated purchasing page for user action.

US 20120117569 A1 entitled "Task automation for unformatted tasks determined by user interface presentation formats" discloses methods and systems provided for web page task automation. In one embodiment, the method comprises of the following steps: i) decomposing the high level task into a sequence of anthropomimetic subroutines, ii) decomposing each routine into a series of anthropomimetic actions or steps, for example stored as a unit shares of work, iii) generating computer code to interact with the content of the webpage, for each unit share of work, iv) executing the generated computer code by a web interface module, and transmitting the results of the execution of computer code, steps iii) and iv) being repeated until all steps of a subroutine have been executed, until the sequence of subroutines for a logical task have been achieved.

US 20120117455 A1 entitled "Anthropomimetic analysis engine for analyzing online forms to determine user view-based web page semantics" discloses an analysis engine that executes under client control to review web pages in real-time and control interaction with the web pages of a website to assist the user of the client in providing selections, providing information and otherwise interacting with the website. In analyzing web pages, the engine uses rule-based logic and considers web pages from an anthropomimetic view, i.e., considers the content, forms and interaction elements as would be perceived and dealt with by a human user, as opposed to by merely considering the web pages in their native form, such as HTML formatted files.

Therefore, there is need for a safe future-proof method for ever evolving multi-application and multi-account access on multiple devices by way of unsecured public networks.

This background information is provided to reveal information believed by the applicant to be of possible relevance to the present invention. No admission is necessarily intended, nor should be construed, that any of the preceding information constitutes prior art against the present invention.

BRIEF SUMMARY

The present invention provides, in at least one embodiment, a method and process for users to have secure access to multiple mobile, embedded or web based applications, whereby each requires different authentication, and access to such applications is automated through the use of a single authenticating and authorizing software; the software thereby securely managing the individual authorizations and, in so doing, the authentication required by any individual application on any device. In at least one embodiment, the present invention protects against any intrusion and manipulation whilst assuring that only legitimate user(s) that are properly authenticated have access to their applications. The method secures the secret information required to access these applications and minimizes exposure to any user's sensitive information. Moreover, any secrets that themselves protect information are made strong and the means of access is simplified and automated as much as possible all the while safeguarding the security and confidentiality of all data In at least one embodiment, the present invention provides a method of providing secure authorized access to any third party application comprising the enabling of accessibility function; detecting of an accessibility function event with an accessibility function, activating an input method, establishing communication between the input method and the third party application, retrieving input field characteristics of the third party application with the input method, securely storing the input field characteristics, aggregating the input field characteristics to generate a unique footprint corresponding to the third party application, securely storing the unique footprint so obtained and, apart from secured cryptokeys, deleting all data not securely stored.

DESCRIPTION OF THE DRAWINGS

The features and advantages of the invention will become more readily apparent from the following description, reference here is being made to the accompanying drawings in which:

FIG. 1 is a flow diagram illustrating the process by which Input Method is installed onto the device and configured;

FIG. 2 is a flow diagram illustrating the process by which information is gathered from the Third Party Application and utilized to inform subsequent processes;

FIG. 3 is a flow diagram illustrating the process by which users are automatically logged onto a Third Party Application when the necessary and sufficient information is available for input;

FIG. 4 is a flow diagram illustrating the process by which the user is prompted to choose between multiple accounts when more than one account may be used to log onto the Third Party Application; and FIG. 5 is a flow diagram illustrating the process by which necessary information is obtained for future use of the Input Method when insufficient information is available to log users onto the Third Party Application.

DETAILED DESCRIPTION OF THE EMBODIMENTS

In at least one embodiment, there is provided a method for securely logging onto multiple applications whilst minimizing exposure of the secret information necessary to complete such logon.

The following definitions will be used throughout the following specification:

(1) DEFINITIONS

Accessibility Function Event: An accessibility function event is an event which is fired by an individual View which populates the event with data for its state and requests from its parent the instructions to send the event to interested parties. Examples of Accessibility Function Events include, but are not limited to, announcements, gesture detection end, gesture detection start, notification state changed, touch exploration gesture end, touch exploration gesture start, touch interaction end, touch interaction start, view accessibility focused, view accessibility focus cleared, view clicked, view focused, view hover enter, view hover exit, view long clicked, view scrolled, view selected, view text changed, view text selection changed, view text traversed at movement granularity, window content changed and window state changed, among other Accessibility Function Events that will be readily understood by the skilled person.

Accessibility Function: An Accessibility Function runs in the background and receives call-backs by the system when accessibility function events are fired. Such accessibility function events denote some state transition in the user interface, for example, the focus has changed, a button has been clicked, etc. Such an Accessability Function can optionally request the capability for querying the content of the active window. As an example, in Android™ devices the Accessibility Function is called an Accessibility Service, however other arrangements in other operating systems are also contemplated.

API: Application programmer's interface.

Credentials: Information which is required to authorize access to a Third Party Application's functions and features. Information such as, but not limited to, usernames, passwords, email address(es), received email data, biometrics, tags, memos, credit cards, identifying documents, various signatures, among various other credentials that will be readily understood by the skilled person, that help users distinguish between different sets of Credentials, amongst others.

Datastore: The Datastore is a service having a repository, either on board the device or at a remotely accessible location, where Input Method can save encrypted data that is secured and un-encrypted data which is short lived or which requires no protection, such as Credentials, usage statistics or any other information needed to successfully complete user input sessions. In at least one embodiment a datastore is a remotely located secure server.

Encryption Key: A string of characters used as a key to encrypt a Secret.

Encryption symmetric key: A random-character string used with a symmetric encryption algorithm to encrypt data.

{ . . . }: The set containing the elements . . . .

Footprint: A Footprint is a set of information of all the known information for a given user interaction session; an active instance. It can be formed via the Accessibility Function. This includes, and is not limited to, a history of all user interactions for the current input session, the list of all known Input Fields, all their Input Field characteristics and any related data, among other arrangements that will be readily understood by the skilled person. A Footprint which is created lets the Input Method precisely determine in what context the users are currently inputting data; as such each footprint is unique and has a unique ID.

Input Field: An Input Field is a user-interface element in a Third Party Application that users interact with to indicate choices made as well as entering information into the Third Party Application. These Input Fields transfer the actual capture of information to Input Method. Examples of Input Fields include, but are not limited to: text fields, numeric or any alphanumeric fields, buttons, check boxes, radio buttons, switches, toggle buttons, biometric/voice/gesture or card activated sensor/transducer entry fields among other types of input fields that will be readily understood by the skilled person.

Input Field characteristics: The Input Field characteristics are additional information associated with Input Fields. This information can be made available to Input Method by the Third Party Application. It can also indicate to the Input Method how to format input information string or text, or make specific requests as to how to behave based on any user information, give hints as to the nature of the input, among various other types of input field characteristics that will be readily understood by the skilled person.

Input Method: A software program that can be responsible for requesting information from the user, securely storing said information and passing along the information to a Third Party Application. It is also contemplated that this software program can call a Third Party Application and record the Third Party Application Input Fields and their required input formats. This includes, but is not limited to: software touch-enabled keyboards, speech to text interpretation, gesture based alpha-numeric keyboards, numeric keyboards, written text interpretation, any biometric to information string interpretation, and card or other media input to information string interpretation, the selection of values in a list, among other types of input methods that will be readily understood by the skilled person.

Package Signature: A Java™ specific, Android™ specific, iOS™ specific or any other device specific unique signature that is used to identify any Third Party Application.

Session: A semi-permanent interactive information exchange between two or more interactive devices or between a device and a user.

Third Party Application: Any application or software installed on the user's device or accessible by the device via the web that could require Input Method to be initiated by, or actively interact with, the user.

View: A View represents the basic building block for User Interface components. A View can, if on screen, occupy a rectangular area located anywhere on the screen and can be responsible for drawing and event handling, among other representations and aspects that will be readily understood by the skilled person.

(2) EXAMPLE

In at least one embodiment, the present invention provides a novel multi-application and multi-account access on mobile or other devices by way of unsecured public networks, as will be described hereinafter. Although the invention is described in terms of specific illustrative embodiment(s), it is to be understood that the embodiment(s) described herein are by way of example only and that the scope of the invention is not intended to be limited thereby.

Referring to FIG. 1, which is a flow diagram illustrating at least one embodiment of the process by which a user [1] installs onto their device [2] a custom Input Method [3] and updates as necessary from time-to-time. This Input Method would typically be included in a standard application package, but could also be a distinct application package, among other arrangements that are readily contemplated by the skilled person. The custom Input Method is obtained from the device or the device's Operating System originator as modified from time to time for consistency with the claims herein. Upon installation, both the Input Method and Accessibility Function software is enabled [4], the device and/or user account is, manually or automatically, linked [5] with a Datastore [6] that will be used to consult already existing Credentials for this user if applicable, or to create new Credentials later in the process. Future user interactions with third Party Apps on or though the device will then [7] launch this Input Method.

Referring to FIG. 2, which is a flow diagram illustrating at least one embodiment of the process by which the invocation of the Input Method [8] can be triggered by various user interactions [1], such as but not limited to tapping on an Input Field, or selecting an Input Method from another system. Here the application asks for an Input Method from the OS of the device [2]. Once the OS on the device finds an Input Method the Input Method can pass information to the Third Party Application [9, 10].

This is when the device records the signature of the currently executing Third Party Application, that is, the device finds and stores all the Third Party Applications' Input Fields via Accessibility Function and saves their format and other characteristics for each Third Party Application loaded onto or available through the device that requires Credential(s) [11]. If no response is obtained by the Input Method within a certain time interval, Δt, then the recording process can be terminated [12]. The time interval Δt is chosen to minimize intruder capture of sensitive information. If the time interval has not run out, the Input Method can then inspect the Third Party Applications Input Field characteristics, using all introspection methods made available to it by the hosting system. The Input Field characteristics are then aggregated and combined with the signature of the application obtained in [11] to, via Accessibility Function, to create a unique Footprint of the Third Party Application's current context such as but not limited to which output path the user is currently using in the Third Party Application as well as the current state of the application [13]. It should be noted that there should be at least one footprint per active instance of each Third Party Application [13]. All secret information such as a Footprint or Credential(s) is always retained and sent/received as encrypted information [14] and the source information is preferably deleted from all memory and storage [15]. All encrypted information, when needed as source data, is decrypted on the fly, used as necessary, and then deleted per above.

The created Footprint will uniquely identify the state of the Third Party Application when the Input Method was invoked. Using the Footprint as an identifier in the Credentials Datastore [6] can be used to store and retrieve, within a given time period Δt [17] and when needed, the Credentials specific to a given context in a Third Party Application [16]. Again all secret information such as a Footprint or Credential(s) is always retained and sent/received as encrypted information and the source information is deleted from all memory and storage. All encrypted information, when needed as source data, is decrypted on the fly used and then deleted per above. There are two cases here, either the Credential(s) are found within the time period (in this case see FIGS. 3 and 4 for further processes) [18] or the Credential(s) are not found (in this case see FIG. 5 for further processes) [19].

Referring to FIG. 3 which is a flow diagram illustrating at least one embodiment of the process, when a single set of Credentials was found to be associated to a specific Footprint, by which the Input Method [8] automatically fills out the Third Party Application's Input Fields [20]. The Footprint holds information about all the Input Field entries that allows the Input Method software to target the appropriate field (for example but not limited to personal identifies, credit card information, username or password, among other readily appreciated Credentials) and discriminate between what goes where thus insuring that the Credentials are properly entered.

Once properly entered the Input Field submission is triggered on the Third Party Application. [21]. If the submission is timed out (i.e. $\Delta t > \Delta t_{max}$) without a Confirmation of submission then a new submission request is made for up to $N_{max}$ times [22]. If a Confirmation is received then one continues to FIG. 5.

Referring to FIG. 4 which is a flow diagram illustrating at least one embodiment of the process which illustrates the process when multiple appropriate sets of Credentials are found in the Datastore [6]. Users are prompted to select between the various Credentials, and upon selection automatic login is triggered as follows: first trigger the submission input field (based on multiple potential accounts) on the Third Party Application by making the multiple accounts easily 'viewable' with respect to input field related to the Input Method. Also, assure that such 'visibility' for a fast input decision by the user coincides with minimizing user error on input (e.g. use of colors, prompts and feedback in real-time whilst input is in progress) [24]. Second, upon completion of user input, automatically enter in the proper Input Field(s) data on each Third Party Application using Credential(s) (see [20]) [25] and, thirdly, trigger the submission input field on the 3rd party application (see [21]-[23]) [26].

Referring to FIG. 5 which is a flow diagram illustrating at least one embodiment of the process which shows how to store new sets of previously unknown Credentials into the Datastore [6], associated with an accurate Footprint that was previously generated (see for example FIG. 2). Here the user [1] inputs a set of new credentials [27] whereby the system (1) verifies the validity of the new Credentials with respect to their, for example, format and other predetermined criteria and then (2) associates the new credentials with the current Footprint (i.e. the current Footprint was already selected once, at least, one Third Party Application is active) and this within a time period $\Delta t = \Delta t_{max}$ [28]. Then the user submits new credentials (again within $\Delta t = \Delta t_{max}$) whereby the selection 'hot area' is invoked upon user entry of valid Credentials into the Input Field via Input Method [29]. These Credentials and, as may be the case, the updated Footprint are encrypted and saved onto Datastore [30]. Upon confirmation thereof the system active on the device deletes all source secrets in device's [2] memory or storage [31] and thereafter submits the Credentials to the Third Party Application.

The embodiments of the invention for which an exclusive property or privilege is claimed are defined as follows:

1. A method of providing secure authorized access to a third party application comprising:
   enabling an accessibility function;
   detecting a user interaction with the accessibility function;
   in response to detecting the user interactions, activating an input method;
   establishing communication between the input method and the third party application;
   retrieving input field characteristics of the third party application and user interactions received using the input method via the accessibility function;
   securely storing the input field characteristics;
   generating a unique footprint corresponding to the third party application, wherein the unique footprint comprises a history of the user interactions detected by the accessibility function and the input field characteristics;
   securely storing the unique footprint;
   identifying at least one set of credentials that corresponds to the unique footprint;
   retrieving the at least one set of credentials; and
   communicating one set of the at least one set of credentials to the third party application with the input method.

2. The method of claim 1, further comprising deleting unsecure data.

3. The method of claim 1, wherein the third party application has at least one input field.

4. The method of claim 1, wherein the communication between the input method and the third party application is encrypted.

5. The method of claim 1, wherein if the input method does not retrieve the input field characteristics within a predetermined time interval, the input method is terminated.

6. The method of claim 1, wherein if the input method does not communicate one set of the at least one set of credentials to the third party application within a predetermined time interval, a new submission request is generated.

7. The method of claim 1, wherein the input field characteristics are aggregated with the one set of the at least one set of credentials.

8. The method of claim 1, further comprising:
   autofilling at least one input field on the third party application with the one set of the at least one set of credentials.

9. The method of claim 1, wherein the at least one set of credentials is multiple sets of credentials and further comprising:
   prompting a user to select the at least one set of credentials from the multiple sets of credentials.

10. A non-transitory computer readable medium for providing secure authorized access to a third party application comprising computer readable code executable by one or more processors to:
    enable an accessibility function;
    detect a user interaction with the accessibility function;
    in response to detecting the user interactions, activate an input method;
    establish communication between the input method and the third party application;
    retrieve input field characteristics of the third party application and user interactions received using the input method via the accessibility function;
    securely store the input field characteristics;
    generate a unique footprint corresponding to the third party application, wherein the unique footprint comprises a history of the user interactions detected by the accessibility function and the input field characteristics;
    securely store the unique footprint;
    identify at least one set of credentials that corresponds to the unique footprint;
    retrieve the at least one set of credentials; and
    communicate one set of the at least one set of credentials to the third party application with the input method.

11. The computer readable medium of claim 10, further comprising computer readable code to delete unsecure data.

12. The computer readable medium of claim 10, wherein the third party application has at least one input field.

13. The computer readable medium of claim 10, wherein if the input method does not retrieve the input field characteristics within a predetermined time interval, the input method is terminated.

14. The computer readable medium of claim 10, further comprising computer readable code to:

autofill at least one input field on the third party application with the one set of the at least one set of credentials.

15. A system for providing secure authorized access to a third party application comprising:
   one or more processors; and
   one or more computer readable media comprising computer readable code executable by the one or more processors to:
   enable an accessibility function;
   detect a user interaction with the accessibility function;
   in response to detecting the user interactions, activate an input method;
   establish communication between the input method and the third party application;
   retrieve input field characteristics of the third party application and user interactions received using the input method via the accessibility function;
   securely store the input field characteristics;
   generate a unique footprint corresponding to the third party application, wherein the unique footprint comprises a history of the user interactions detected by the accessibility function and the input field characteristics;
   securely store the unique footprint;
   identify at least one set of credentials that corresponds to the unique footprint;
   retrieve the at least one set of credentials; and
   communicate one set of the at least one set of credentials to the third party application with the input method.

* * * * *